May 31, 1966  R. J. WIRSCHING  3,253,585
CONTROL MECHANISM FOR ADJUSTING THE FUEL INJECTION
OF FUEL INJECTION ENGINES
Filed May 6, 1963  2 Sheets-Sheet 2
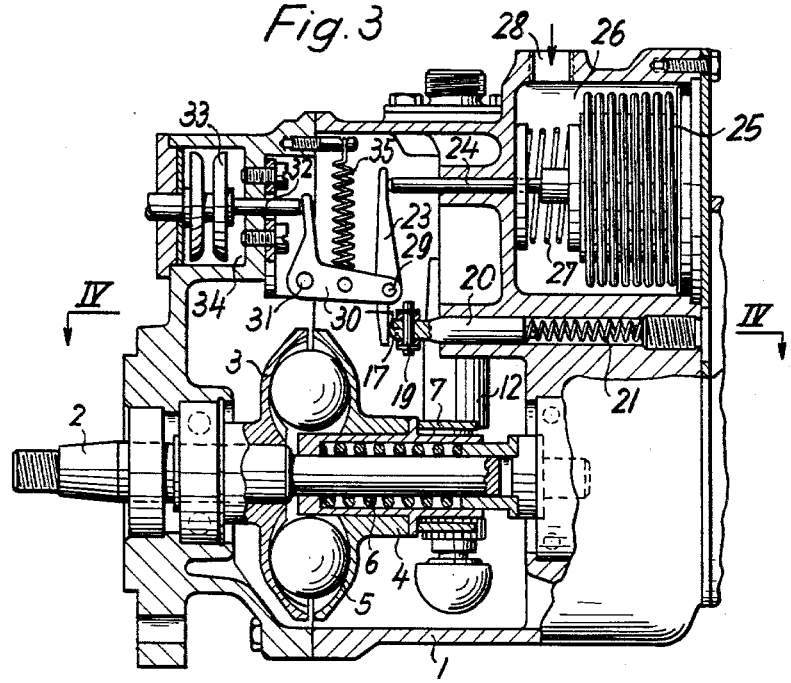
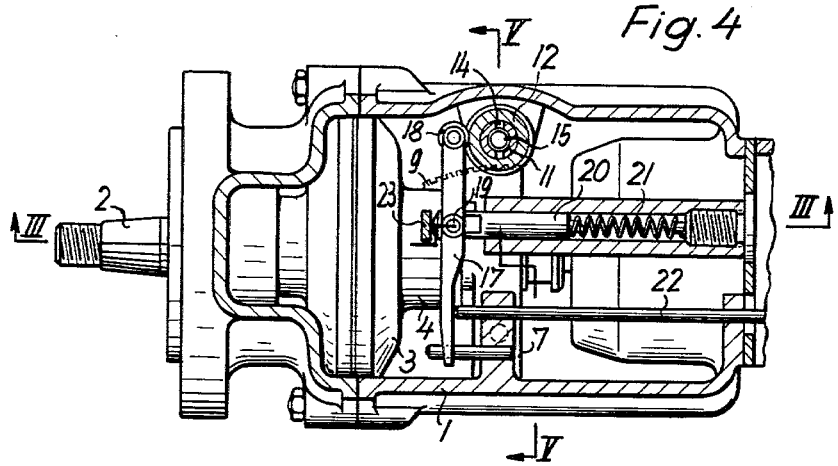
INVENTOR
ROBERT J. WIRSCHING
BY *Dicke + Craig*
ATTORNEYS

United States Patent Office 3,253,585
Patented May 31, 1966

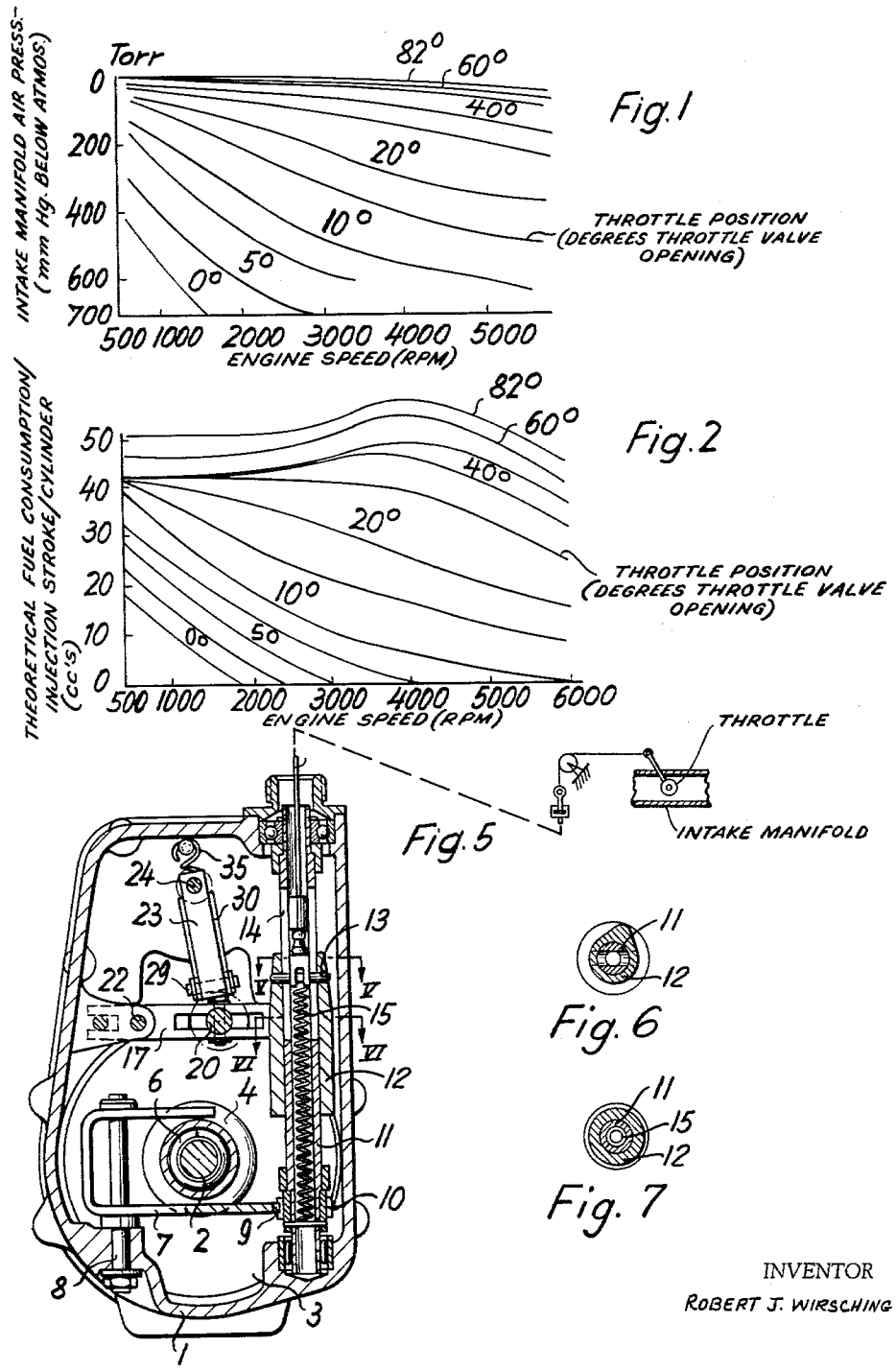

---

3,253,585
CONTROL MECHANISM FOR ADJUSTING THE FUEL INJECTION OF FUEL INJECTION ENGINES
Robert J. Wirsching, Korntal, Germany, assignor to Daimler-Benz Aktiengesellschaft, Stuttgart-Unterturkheim, Germany
Filed May 6, 1963, Ser. No. 278,250
Claims priority, application Germany, May 9, 1962,
D 38,875
6 Claims. (Cl. 123—140)

The present invention relates to a control mechanism for adjusting the quantity of fuel to be injected into a fuel injection engine by means of an elongated, three-dimensional cam which is traced indirectly by a control member of the injection pump by means of a lever and which may be turned about its axis and also shifted in the longitudinal direction in accordance with the position of the throttle and the speed of the engine.

The control mechanisms of fuel injection pumps of engines of the above-mentioned type are required for the difficult purpose of adjusting the quantity of fuel to be injected at any operating conditions of the engine which may occur in actual practice, and especially at sudden changes of the engine in load and speed, in accordance with the amount of combustion air which is contained in the engine cylinders at any particular time. Furthermore, in accordance with the power required of the engine, the rate of fuel injected should also be more or less ample in comparison to the amount of air in the engine cylinders so as to permit, for example, the most inexpensive operation as possible when the engine runs under a partial load and the greatest possible power when it is running under a full load. One variable which has to be considered in the operation of the engine and which is interrelated to the fuel consumption is the intake pipe pressure, that is, the negative pressure of the sucked-in combustion air in the intake pipe.

The diagrams as shown in FIGURES 1 and 2, respectively, illustrate the dependency of the intake pipe pressure and of the required quantity of fuel to be injected on the speed and the position of the throttle of a modern fuel injection engine. FIGURE 1 shows that, when the speed increases, the intake pipe pressure drops considerably if the throttle remains more or less closed, whereas the intake pipe pressure is practically independent of this speed when the throttle is fully opened. The required quantity of fuel to be injected therefore also decreases considerably when the throttle is more or less closed and when the speed increases, whereas when the throttle is fully opened, the required quantity of fuel for the speed under full load should be increased as against the intake pipe pressure in order to attain the most suitable power factor of the engine.

The fundamental connections of the two mentioned diagrams already led many years ago to the development of pneumatic injection pump governors which control the quantity of injected fuel substantially in accordance with the intake pipe pressure. Although such governors have proved very successful especially for aircraft engines, they are not entirely satisfactory for automobile engines. This is not only due to the fact that the control by means of the intake pipe pressure following a throttle adjustment necessarily involves a certain delay in the supply of the required quantity of fuel, but it is also due to the fact that the required quantity of injected fuel within the full-load range according to FIGURE 2 is subject to much greater variations than the intake pipe pressure. Therefore, in order to overcome these difficulties, the pneumatic governors as are presently known require the additional employment of relatively complicated compensating valves.

In view of this deficiency of pneumatic governors for automobile engines, they are now frequently replaced by mechanical governors whereby the quantity of fuel to be injected into the engine cylinders is regulated mechanically, primarily in response to the adjustment of the throttle and to the speed. Such a governor which is of the same general type as that according to the invention in provided with a three-dimensional cam which is slidable longitudinally in accordance with the adjustment of the position of the throttle and may be turned in accordance with the speed of the engine, and which is traced by a lever which, in turn, is connected to the control rod of the injection pump. For controlling the movements of this cam in accordance with the speed of the engine, a centrifugal governor is employed which has especially the purpose to reduce very quickly the quantity of fuel to be injected when the throttle is more or less closed and the speed increases even from a low rate. Even though such a governor is fully satisfactory when the throttle is more or less opened and when the required quantity of fuel depends very little upon the speed of the engine even within the lower speed range and even though this type of governor responds better and more quickly than the known pneumatic type of governor to the different operating conditions within the higher load range, it still has the disadvantage that it responds rather slowly within the lower load range and especially at a simultaneous lower speed of the engine. This is due to the fact that the centrifugal governor is required to operate very efficiently already within the lower speed range, even though only very small centrifugal forces are available in this range.

It is an object of the present invention to provide a control mechanism of the type as mentioned at the beginning which also overcomes the deficiency of the last-mentioned governor and further improves the latter by permitting the quantity of fuel to be injected to be quickly and reliably adapted to the operating conditions of the engine within the upper load range and also at quick changes within the partial-load range without requiring any complicated correcting means such as compensating valves or the like which usually do not even operate with sufficient accuracy.

According to the invention, this object is attained primarily by providing the control mechanism with an additional control member of a type known as such which is pneumatically actuated in response to the intake pipe pressure of the engine and is coupled with a transmitting element between the three-dimensional control cam and the control member of the fuel injection pump so as to exert a different influence upon both of these control parts.

This combination of a pneumatic governor with a mechanical governor permits the comparatively large amount of adjustment work within the partial-load range at lower speeds to be carried out in a known manner pneumatically by the negative pressure in the intake pipe through the mentioned control member, so that within this range the centrifugal governor is relieved of work accordingly. The large pressure differences which occur within the partial-load range in the intake pipe in accordance with the speed of the engine then insure a sufficiently quick operation of the pneumatic governor, while within the full-load range at a corresponding higher speed when the intake pipe pressure changes only slightly, the centrifugal governor is capable of acting very efficiently so as to effect by a suitable cam curvature the injection of the larger quantity of fuel as indicated in FIGURE 2 without requiring any complicated compensating valves or similar means. The control mechanism according to the invention therefore permits a very accurate and quick regulation of the quantities of fuel to be injected within all load ranges of the engine.

According to a preferred embodiment of the invention, the pneumatically actuated control member is provided in the form of an evacuated bellows within a chamber which is under the action of the intake pipe pressure. Thus, there is no need for compensating for changes in altitude since the bellows functions at the same time as an an aneroid.

These and other features and advantages of the present invention, including an additional responsiveness of the control mechanism to the temperature in the intake pipe, will become more clearly apparent from the following detailed description thereof which is to be read with reference to the accompanying drawings, in which—

FIGURE 1 shows a diagram which indicates the intake pipe pressure in response to the throttle position and the speed of an engine which is provided with the control mechanism according to the invention;

FIGURE 2 shows a diagram which indicates the required quantity of fuel to be injected in response to the throttle position and the speed of the same engine;

FIGURE 3 shows a vertical longitudinal section which is taken along the line III—III of FIGURE 4 of the control mechanism according to the invention;

FIGURE 4 shows a horizontal longitudinal section of the same control mechanism which is taken along the line IV—IV of FIGURE 4;

FIGURE 5 shows a cross section of the same control mechanism which is taken along the line V—V of FIGURE 4;

FIGURE 6 shows a cross section of the three-dimensional cam according to the invention taken along line V—V of FIGURE 5; and FIGURE 7 shows a cross section of the three-dimensional cam according to the invention taken along line VI—VI of FIGURE 5.

In both FIGURES 1 and 2, the throttle position for each data curve is indicated by the number of degrees that the throttle valve is open. Zero degrees represents a substantially closed throttle, while maximum throttle valve opening occurs at 82 degrees.

The control mechanism according to the invention, as illustrated in FIGURES 3 to 5 comprises a housing 1 in which a shaft 2 is mounted. The end of this shaft which projects from the housing may be driven in a suitable manner, not shown, by a fuel-injection engine at a speed in a certain rate to the speed of the engine. This shaft 2 may also be used, for example, for the additional purpose of driving an associated fuel injection pump of a conventional type. Within housing 1, shaft 2 drives a centrifugal governor 3, the governor sleeve 4 of which may be shifted from the position as shown in FIGURE 3 in a direction coaxially to shaft 2 toward the right by the centrifugal force of the balls 5 against the action of a return spring 6. The governor sleeve 4 cooperates with a control lever 7 which extends substantially at right angles to shaft 2 and is pivotably mounted at one end on a pivot pin 8 in housing 1 and carries on its other free end a segmental rack 9 which engages with a pinion 10. This pinion is secured to a tubular shaft 11 which is rotatably mounted in housing 1 parallel to the axis of pivot pin 8 of the control lever 7.

This tubular shaft 11 carries a three-dimensional cam 12 of a considerable length which for this purpose has an axial bore and is nonrotatable on shaft 11 but slidable thereon in the axial direction by means of a cross pin 13 which extends transversely through cam 12 and shaft 11 and is movable along the latter in longitudinal slots 14. Crosspin 13 is connected within shaft 11 at one side to one end of a tension spring 15 which is connected at its other end by means of another crosspin to the lower end of shaft 11, while at its other side crosspin 13 is connected to a cable 16 which, in turn, is connected in a conventional manner, as schematically illustrated in FIGURE 5, with the throttle and serves for drawing cam 12 upwardly along shaft 11 against the action of spring 15 when the throttle is being closed.

Cam 12 which tapers considerably toward its upper end engages with a roller 18 on one end of a straight two-armed lever 17 which extends within a plane transverse to shaft 11 and is pivotably mounted on a pivot pin 19 on a rod 20 which extends within the same transverse plane and substantially at right angles to lever 17. Rod 20 is guided within housing 1 so as to be slidable longitudinally therein and it is acted upon by a compression spring 21, the tension of which is adjustable and which tends to lift roller 18 off the cam 12. The other end of the two-armed lever 17 engages upon one end surface of a control rod 22, the other end of which, not shown, controls the operation of the control member of the injection pump in the usual manner, that is, in the present instance by increasing the quantity of fuel to be injected when the control rod 22 is moved toward the left, as viewed in FIGURE 4, and by reducing it when the control rod is moved toward the right.

As illustrated particularly in FIGURE 3, the outer end surface of rod 20 adjacent to the pivot pin 19 engages upon one end of another two-armed lever 23, the other end of which engages upon a control pin 24 which is guided in housing 1 so as to be slidable in a direction parallel to rod 20. The other end of this control pin 24 is connected to an evacuated bellows 25 and may be shifted by the latter in the longitudinal direction in the manner as will be subsequently described more in detail. Bellows 25 is mounted in a closed chamber 26 which is formed in housing 1, and it is held under initial pressure by a control spring 27. Chamber 26 is connected by an opening 28 with a part of the intake pipe (not shown) of the engine which is located between the throttle and the engine cylinders.

The two-armed lever 23 which is likewise straight is pivotably mounted on a pivot pin 29 on the free end of one arm of a bell crank 30 which, in turn, is pivotably mounted at its apex on a pivot pin 31 on a part of housing 1. The free end of the other arm of bell crank 30 engages upon the control pin 32 of a thermostat 33 which is located within another chamber 34 in housing 1 and may be acted upon by the combustion air in the intake pipe of the engine in a conventional manner not particularly illustrated. The arm of bell crank 30 which carries the two-armed lever 23 is also acted upon by a tension spring 35 which is connected to housing 1 and tends to pivot bellcrank 30 in the counterclockwise direction, as seen in FIGURE 3, so as to maintain the other arm of the bellcrank in engagement with the control pin 32.

The three-dimensional control cam 12 of the control mechanism as described assumes a different axial position on the tubular shaft 11 whenever a change occurs in the position of the throttle of the engine. Thus, each particular position along the peripheral, basically substantially circular surface of the cam corresponds to a certain position of the throttle. If at such a position of the throttle the speed of the engine is varied in accordance with the diagram according to FIGURE 1, the control mechanism is further influenced primarily by the intake pipe pressure through the bellows 25, the control pin 24, and the two two-armed levers 23 and 17, and it is also controlled by the particular curvature of the three-dimensional cam 12 at the point of the latter which corresponds to this throttle position.

A comparison between FIGURES 1 and 2 shows clearly that the necessary corrective adjustment of the position of control rod 22 by means of the control cam 12 is most effective when the engine is running with the throttle valve open from 40 degrees to wide open throttle. Within this throttle range, when the intake manifold pressure is substantially constant, the centrifugal governor 3 is capable of responding very quickly to control the fuel pump in accordance with the fuel requirements of the engine. However, the centrifugal governor is not capable of responding equally as well when the engine is operating within the throttle position range of substantially closed throttle to 40 degrees open throttle, and especially within the low speed range. The fuel requirements vary greatly within this operating range; however, the intake manifold air pressure also varies within this operating range and in direct relation to the required quantity of fuel to be injected. Therefore, in this particular operating range, when a centrifugal governor is substantially non-responsive, the air intake pressure responsive means described above is effective to primarily control the control rod 22. The three dimensional cam is designed accordingly. The peripheral surface of the lower part of the three-dimensional cam 12 which cooperates with the roller 18 of lever 17 when the throttle is more or less closed, is therefore made of a shape which differs only slightly from a circular shape, as shown in FIG. 7, whereas the peripheral surface of the upper part of the cam which cooperates with the roller 18 of lever 17 when the throttle is more or less fully opened, differs from a circular shape to a greater extent, as shown in FIG. 6, in order to insure at this point of the cam that the required quantity of fuel will be injected which then depends more upon the speed of the engine than upon the intake pipe pressure. As stated above, the required quantity of fuel varies more considerably than the intake pipe pressure only within the upper speed range and within the range of throttle valve openings of 40 degrees to 82 degrees where the centrifugal governor 3 is already able to act very efficiently as well as quickly and accurately. Therefore, in connection with the mentioned operation of the control rod 22, the upper part of the three-dimensional cam 12 as shown in FIGURES 3 and 5 is contoured so as to decrease in thickness in accordance with the increase in speed of the engine.

The further temperature-responsive adjustment of the control mechanism which acts in a conventional manner upon the absolute quantity of fuel to be supplied and which therefore influences the transmission ratio of the two-armed lever 23 by means of the bellcrank 30 is clearly evident from the drawings and therefore does not require a detailed description of the function of the thermostat 33.

Although my invention has been illustrated and described with reference to the preferred embodiment thereof, I wish to have it understood that it is in no way limited to the details of such embodiment, but is capable of numerous modifications within the scope of the appended claims. It is thus, for example, possible to provide the centrifugal governor of a construction different from that as shown and to modify considerably the arrangement and structural design of the different transmission elements of the control mechanism.

Having thus fully disclosed my invention, what I claim is:

1. In combination with a fuel injection pump driven in timed relation with a fuel injection engine, a control mechanism for adjusting the quantity of fuel to be injected into at least one cylinder of the engine in accordance with the position of the engine throttle, the engine speed and the air pressure within the intake manifold comprising:

three dimensional cam means, means operatively connecting said cam means with the engine throttle for actuating said cam means along one path of movement proportional to the position of said throttle, mechanical governor means operatively connected with said cam means for actuating said cam means along a second path of movement proportional to the engine speed independently of the position of said throttle, a control member operatively associated with the fuel injection pump for adjusting the quantity of fuel to be injected into the engine cylinder by said pump, transmitting means operatively associated with said cam means and said control member for adjusting the position of said control member in relation to the change in position of said cam means, and pneumatic governor means operatively associated with said transmitting means for superimposing control on said transmitting means in proportion to intake air pressure of said engine along with the control applied thereto by said cam means, said cam means having a contour such that when moved into an initial range of positions along said one path of movement corresponding to throttle openings from idle to part throttle, exclusive control of said transmitting means is in response to operation of said pneumatic governor means, and a contour on said cam means such that when moved from said initial range of positions along said one path of movement into another range of positions corresponding to throttle openings from part throttle to wide open throttle exclusive control of said transmitting means is in response to said mechanical governor means and operation of said throttle from part throttle to wide open throttle.

2. A control mechanism as defined in claim 1, in which said pneumatic governor means comprise a chamber, communicating means for connecting said chamber to the intake pipe of the engine, and an evacuated bellows mounted in said chamber.

3. A control mechanism as defined in claim 1, in which said transmitting means comprise a substantially straight two-armed lever, first bearing means for mounting said lever so as to be pivotable about an axis, means for maintaining one arm of said lever in engagement with the outer surface of said cam means and the other arm in connection with said control member, and control means connected to said pneumatically controlled means for shifting said bearing means in a direction transverse to said axis.

4. A control mechanism as defined in claim 3, in which said last control means comprise a second two-armed lever and second bearing means mounting said second lever so as to be pivotable about an axis extending substantially at right angles to the axis of said first bearing means of said first lever, one arm of said second lever being connected to said pneumatically controlled means and the other arm to said first bearing means of said first lever, and further comprising temperature-responsive means adapted to communicate with said intake pipe, and means connecting said temperature-responsive means to said second bearing means of said second lever for shifting said second bearing means relative to said pneumatic governor means and said first bearing means of said first lever so as to vary the transmission ratio of said second lever in response to changes in temperature in said intake pipe.

5. A control mechanism as defined in claim 3, wherein said control means includes a second two-armed lever operatively connected at one end thereof to said pneumatic governor means and at the other free end thereof abutting against said first bearing means of said first two-armed lever, said first bearing means including spring means yieldably opposing the influence of said second two-armed lever on said first two-armed lever.

6. A control mechanism as defined in claim 5, further comprising temperature sensing means responsive to the temperature of the suction air, second bearing means for mounting said second two-armed lever so as to be pivotable about an axis, said temperature sensing means including a second control means operatively connected with said second bearing means for superimposing upon said second two-armed lever the influence of said temperature sensing means.

References Cited by the Examiner

UNITED STATES PATENTS

| | | | |
|---|---|---|---|
| 2,341,257 | 2/1944 | Wunsch | 123—140.3 |
| 2,378,037 | 6/1945 | Reggio | 123—140.31 |
| 2,670,724 | 3/1954 | Reggio | 123—140.31 |
| 2,825,321 | 3/1958 | Anders | 123—140.3 |
| 3,015,326 | 1/1962 | Wirsching et al. | 123—140.31 |

FOREIGN PATENTS 811,904   4/1959   Great Britain.

MARK NEWMAN, *Primary Examiner.*

RICHARD B. WILKINSON, *Examiner.*